United States Patent
Danilov et al.

(10) Patent No.: US 11,347,553 B2
(45) Date of Patent: May 31, 2022

(54) DATA DISTRIBUTION FOR FAST RECOVERY IN CLUSTER-BASED STORAGE SYSTEMS

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 526 days.

(21) Appl. No.: 16/552,251

(22) Filed: Aug. 27, 2019

(65) Prior Publication Data

US 2021/0064439 A1 Mar. 4, 2021

(51) Int. Cl.
*G06F 9/46* (2006.01)
*G06F 9/50* (2006.01)
*G06F 3/06* (2006.01)
*G06F 11/14* (2006.01)

(52) U.S. Cl.
CPC ............ *G06F 9/5033* (2013.01); *G06F 3/064* (2013.01); *G06F 3/067* (2013.01); *G06F 3/0619* (2013.01); *G06F 9/505* (2013.01); *G06F 11/1471* (2013.01)

(58) Field of Classification Search
CPC ...... G06F 9/5033; G06F 9/505; G06F 3/0619; G06F 3/064; G06F 3/067; G06F 3/0689; G06F 11/1471; G06F 11/2094; G06F 2206/1012
See application file for complete search history.

(56) References Cited

U.S. PATENT DOCUMENTS

| | | | | |
|---|---|---|---|---|
| 6,549,931 B1* | 4/2003 | Amor | ................... | G06F 9/5066 707/999.2 |
| 7,734,643 B1* | 6/2010 | Waterhouse | ............ | G06F 16/10 711/111 |
| 2004/0073409 A1* | 4/2004 | Fehn | ...................... | G05B 17/02 703/1 |
| 2006/0018556 A1* | 1/2006 | Ghildiyal | ............ | H03M 7/3084 382/232 |
| 2010/0064166 A1* | 3/2010 | Dubnicki | ............ | G06F 11/1076 714/1 |

(Continued)

*Primary Examiner* — Emerson C Puente
*Assistant Examiner* — Zhi Chen
(74) *Attorney, Agent, or Firm* — Amin, Turocy & Watson, LLP

(57) ABSTRACT

The described technology is generally directed towards distributing data fragments and coding fragments of a protection group among storage entities (e.g., nodes or disks) based on affinity levels (e.g., maintained in an affinity matrix) that represent dependency relationships between the storage entities with respect to storing protection groups. The technology operates to distribute a protection group's components such that the affinity level between any pair of storage entities is approximately the same as any other pair. In the event of a storage entity failure, as a result of the affinity-based distribution of the protection group components needed for data recovery, a larger number of the other storage entities can be involved in the data recovery (relative to the number likely involved without affinity-based distribution). This tends to assure a better load balance and faster data recovery.

20 Claims, 13 Drawing Sheets

(56) References Cited

U.S. PATENT DOCUMENTS

| | | | |
|---|---|---|---|
| 2010/0202322 A1* | 8/2010 | Cai | H04W 76/38 |
| | | | 370/254 |
| 2012/0060072 A1* | 3/2012 | Simitci | H03M 13/373 |
| | | | 714/752 |
| 2015/0331744 A1* | 11/2015 | Slik | G06F 11/10 |
| | | | 714/764 |
| 2017/0060683 A1* | 3/2017 | Luby | G06F 11/1076 |
| 2018/0039543 A1* | 2/2018 | Luby | H03M 13/373 |
| 2018/0181475 A1* | 6/2018 | Danilov | H03M 13/3761 |
| 2020/0192712 A1* | 6/2020 | Krishnamurthy | G06F 9/5033 |

\* cited by examiner

DATA DISTRIBUTION FOR FAST RECOVERY IN CLUSTER-BASED STORAGE SYSTEMS

TECHNICAL FIELD

The subject application generally relates to data storage, and, more particularly, to distributing data to facilitate data recovery performance, and related embodiments.

BACKGROUND

Conventional data storage techniques can store data in one or more arrays of data storage devices. As an example, data can be stored in an ECS (formerly known as ELASTIC CLOUD STORAGE) system, such as is provided by DELL EMC. Such data storage systems distribute data within a storage cluster in a way that tolerates a maximal number of hardware failures.

For example, ECS uses erasure coding for data protection. With erasure coding, a data portion (e.g. a chunk of user data) is divided into k (e.g. 12) data fragments. Encoding is performed upon the data fragments, with the result of encoding being a set of m (e.g. 4) coding fragments. The resulting k+m fragments make up a protection group (also referred to as a protection set), and are each stored to different storage entities (nodes, or storage devices such as disks). The way the coding is done assures that the system can tolerate the loss of any m fragments. Lost fragments are recovered via a decoding operation using the data maintained on the other storage entities.

Contemporary storage systems including ECS implement capacity load balancing techniques to assure approximately even distribution of data across storage entities. However, load balancing can result in certain protection groups being concentrated among a relatively small subset/group of the storage entities, with other protection groups being concentrated among other relatively small subsets/groups of the storage entities. Such a grouping effect can adversely slow down recovery, because, if a node/disk fails, the node's or disk's groupmates that contain the data needed for recovery are heavily involved in the recovery operation, while the nodes/disks that are not in that group are barely (if at all) involved.

BRIEF DESCRIPTION OF THE DRAWINGS

The technology described herein is illustrated by way of example and not limited in the accompanying figures in which like reference numerals indicate similar elements and in which:

FIG. 3 is a representation of an example affinity matrix data structure that tracks affinity (dependency relationships) between storage entities with respect to storing protection groups (e.g., as in FIG. 2), in accordance with various aspects and implementations of the subject disclosure.

FIG. 5 is a representation of an example affinity matrix data structure that tracks affinity (dependency relationships) between storage entities with respect to storing protection groups, including when affinity-based data distribution logic is used to distribute protection groups, in accordance with various aspects and implementations of the subject disclosure.

DETAILED DESCRIPTION

Figure 1:
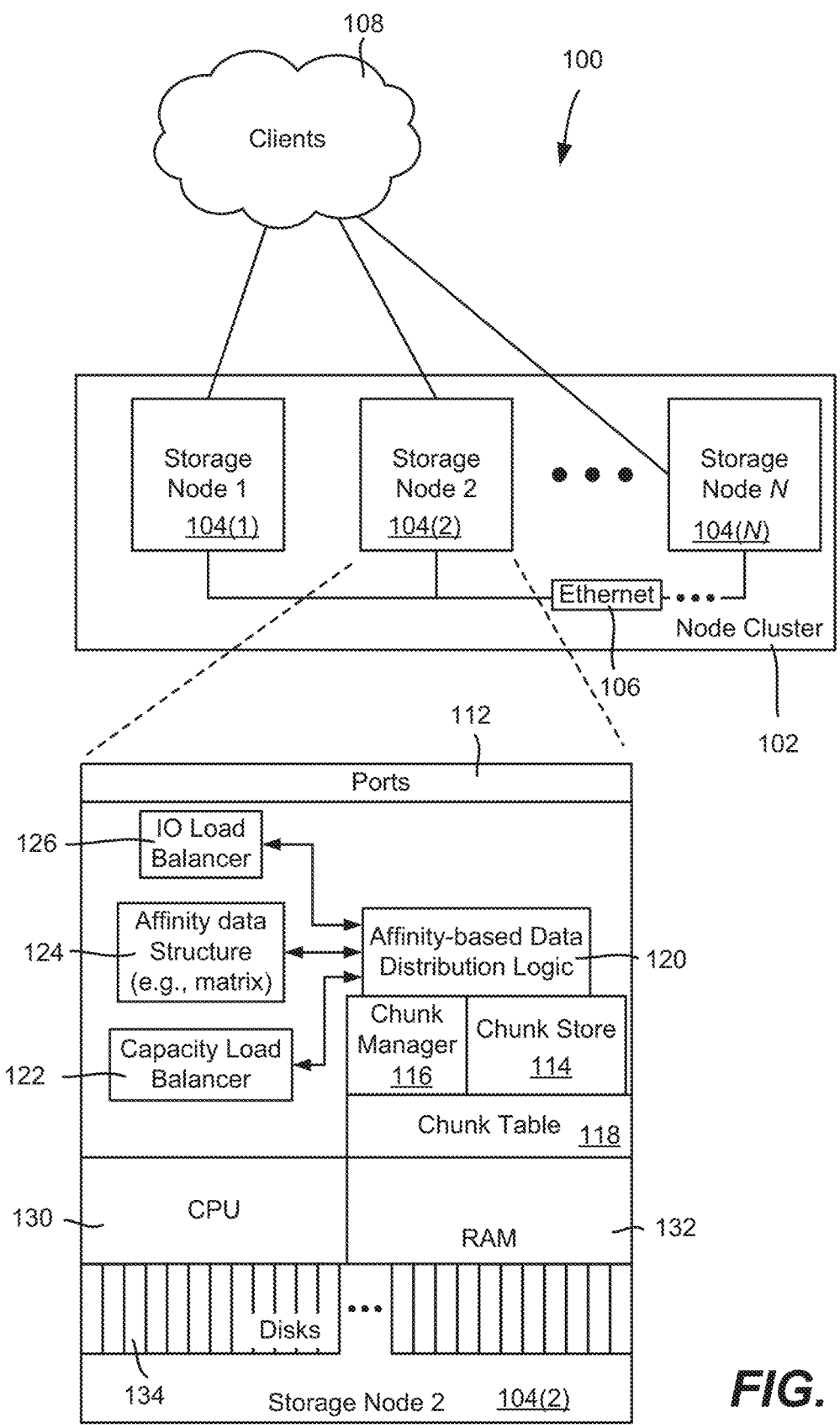
FIG. 1 is an example block diagram representation of part of a data storage system including nodes, in which affinity-based data distribution logic is used to distribute protection groups, in accordance with various aspects and implementations of the subject disclosure.

Aspects of the technology described herein are directed towards data distribution in a cluster-based storage system in a way that helps to accelerate the data recovery process. As will be understood, the data distribution operates to reduce the grouping effect that otherwise can concentrate data protection group recovery sets among a relatively small group of storage entities (nodes or disks).

In general, a protection group creates affinity (dependency relationships) between the storage entities that store the protection group's components (data and coding fragments). The affinity level between storage entities, which indicates the mutual dependence between nodes/disks in a cluster with respect to protection groups and recovery data, is tracked in the data storage system. When a protection group needs to be stored, the affinity between the storage entities is considered when selecting a storage component, in an attempt to have the various storage entities in the cluster have similar levels of affinity to one another. Each node may independently manage affinity of the storage entities in the cluster; a node manages affinity for protection groups the node produces.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

As will be understood, the implementation(s) described herein are non-limiting examples, and variations to the technology can be implemented. For instance, the examples herein can be based on having a protection group of 12 data fragments and 4 coding fragments, but systems having other numbers of protection group components can benefit from the technology described herein. Moreover, with respect to storage entities (comprising nodes or storage devices), the term "disk" or "disks" is used in many of the examples described herein; however it is understood that any data storage resource/storage device may be used instead of or in addition to disks. As such, any of the embodiments, aspects, concepts, structures, functionalities, implementations and/or examples described herein are non-limiting, and the technology may be used in various ways that provide benefits and advantages in computing and data storage technologies in general.

FIG. 1 shows part of a cloud data storage system 100 (such as ECS) comprising a node cluster 102 of storage nodes 104(1)-104(N), in which each node is typically a server configured primarily to serve objects in response to client requests. Such storage systems can employ a Redundant Array of Independent Nodes (RAIN) pattern. The nodes 104(1)-104(N) are coupled to each other via a suitable data communications link comprising interfaces and protocols, such as represented in FIG. 1 by Ethernet block 106. A storage cluster thus has a number of (A hardware nodes, and each storage node manages a number (M) of disks.

Clients 108 make data system-related requests to the cluster 102, which in general is configured as one large object namespace; there may be on the order of billions of objects maintained in a cluster, for example. To this end, a node such as the node 104(2) (shown enlarged in FIG. 1 as well) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes an instance of a data storage system; (note however that at least some data service components can be per-cluster, rather than per-node). For example, ECS runs a set of storage services, which together implement storage logic. Services can maintain directory tables for keeping their metadata, which can be implemented as search trees. A blob service maintains an object table (e.g., in various partitions among nodes) that keeps track of objects in the data storage system and generally stores their metadata, including an object's data location information, e.g., within a chunk. There is also a "reverse" directory table (maintained by another service) that keeps a per chunk list of objects that have their data in a particular chunk.

FIG. 1 further represents some additional concepts, in that the user data repository of chunks is maintained in a chunk store 114, managed by another storage service referred to as a chunk manager 116. A chunk table 118 maintains metadata about chunks, e.g., as managed by the chunk manager 116. Chunks of user data are protected by erasure coding, forming protection groups as described herein; (other types of chunks can be protected in other ways, such as by replication).

As described herein, affinity-based data distribution logic 120 operates to distribute protection groups (alternatively referred to as protection sets) comprising related data and coding fragments, in a way that tends to avoid the concentration of the same protection groups on the same storage entities (which can be nodes or storage devices such as disks). In one or more implementations, when a protection group needs to be stored, the affinity-based data distribution logic 120 obtains candidate storage capacity blocks (in candidate storage entities) from a capacity load balancer 122. The affinity-based data distribution logic 120 accesses an affinity data structure 124 (e.g., a matrix) to select storage entities for the protection group, based on affinity levels maintained in the data structure 124, from the candidate entities, and provides the fragments and storage entities to an IO load balancer 126, which assigns the data fragments and the coding fragments to the allocated capacity blocks.

In FIG. 1, a CPU 130 and RAM 132 are shown for completeness; note that the RAM 130 may comprise at least some non-volatile RAM. The node 104(2) further includes storage devices such as disks 134, comprising hard disk drives and/or solid-state drives, or any other suitable type of storage resource. As can be readily appreciated, components of the data storage system including those described herein can be at various times in any storage device or devices, such as in the RAM 132, in the disks 134, or in a combination of both, for example.

Figure 2:
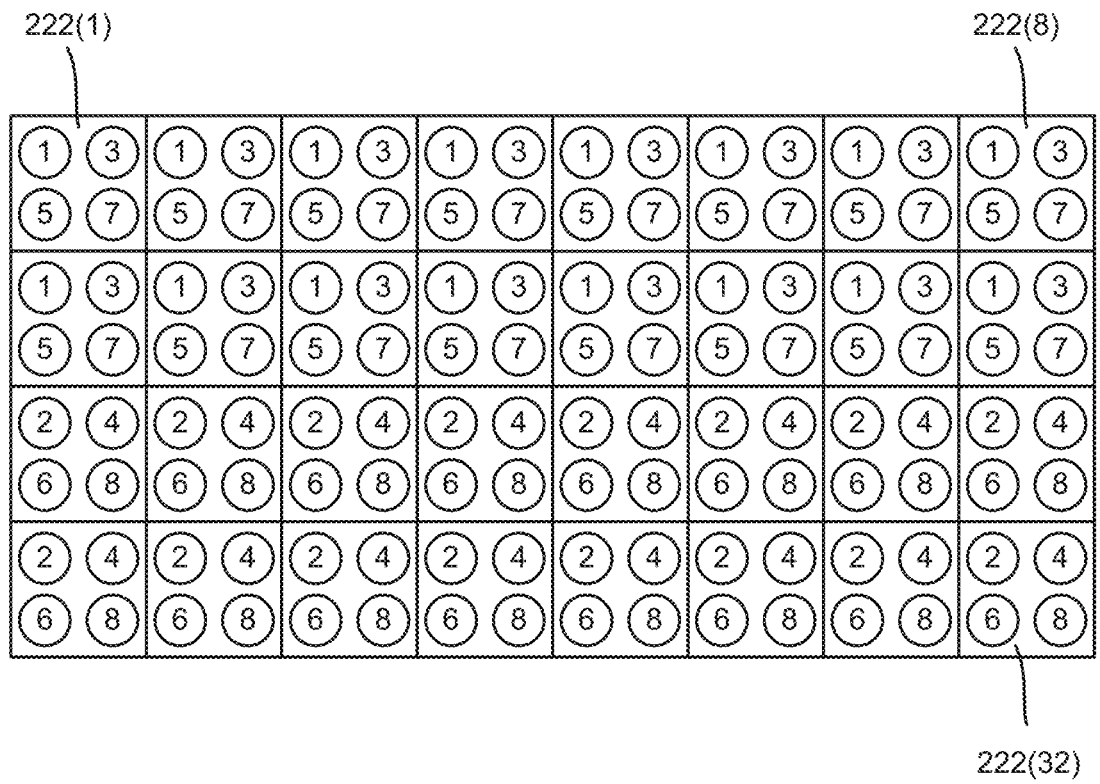
FIG. 2 is an representation of how protection groups can be distributed among storage entities (disks or nodes), in accordance with various aspects and implementations of the subject disclosure.
Figure 3:
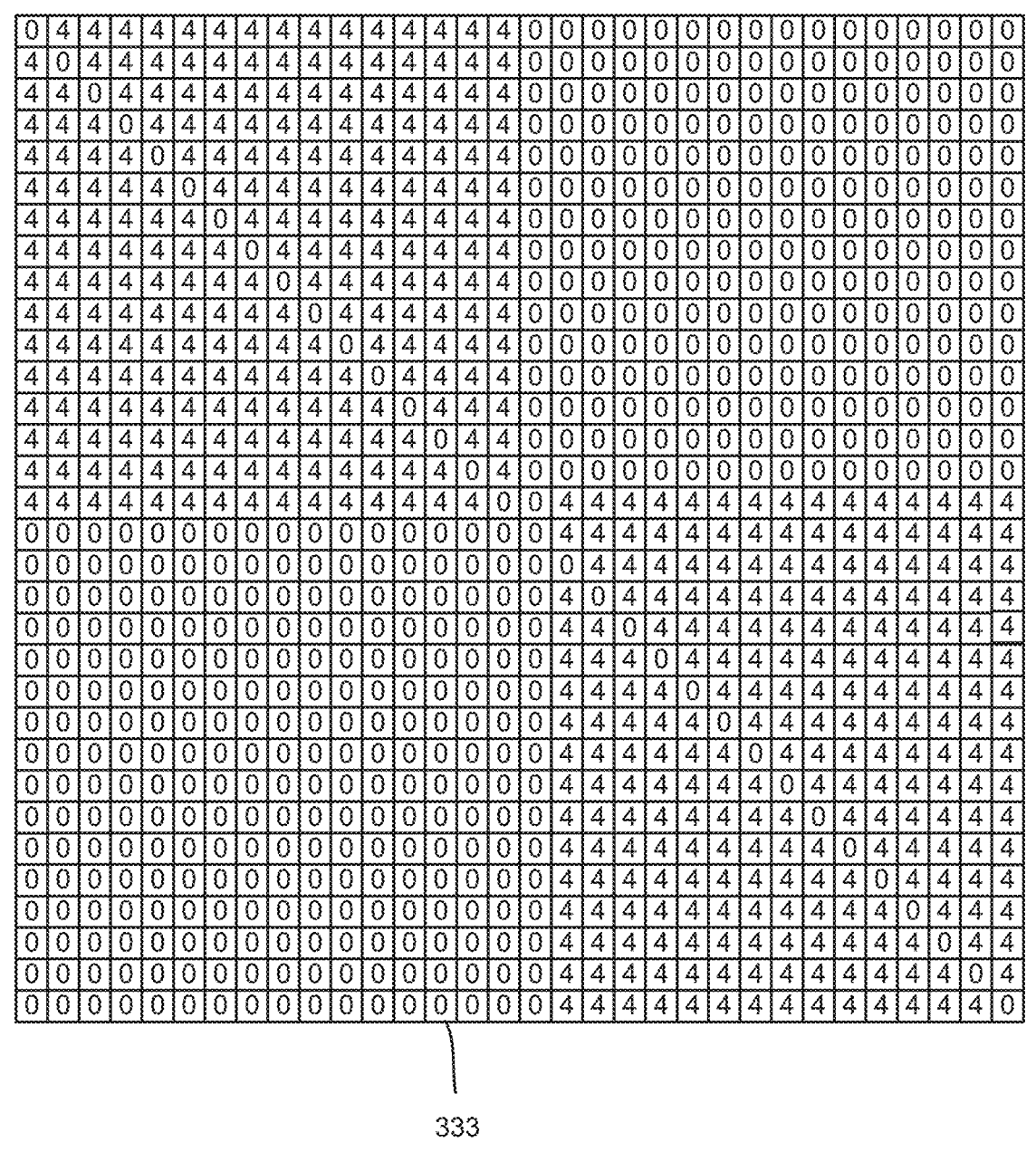
Figure 4:
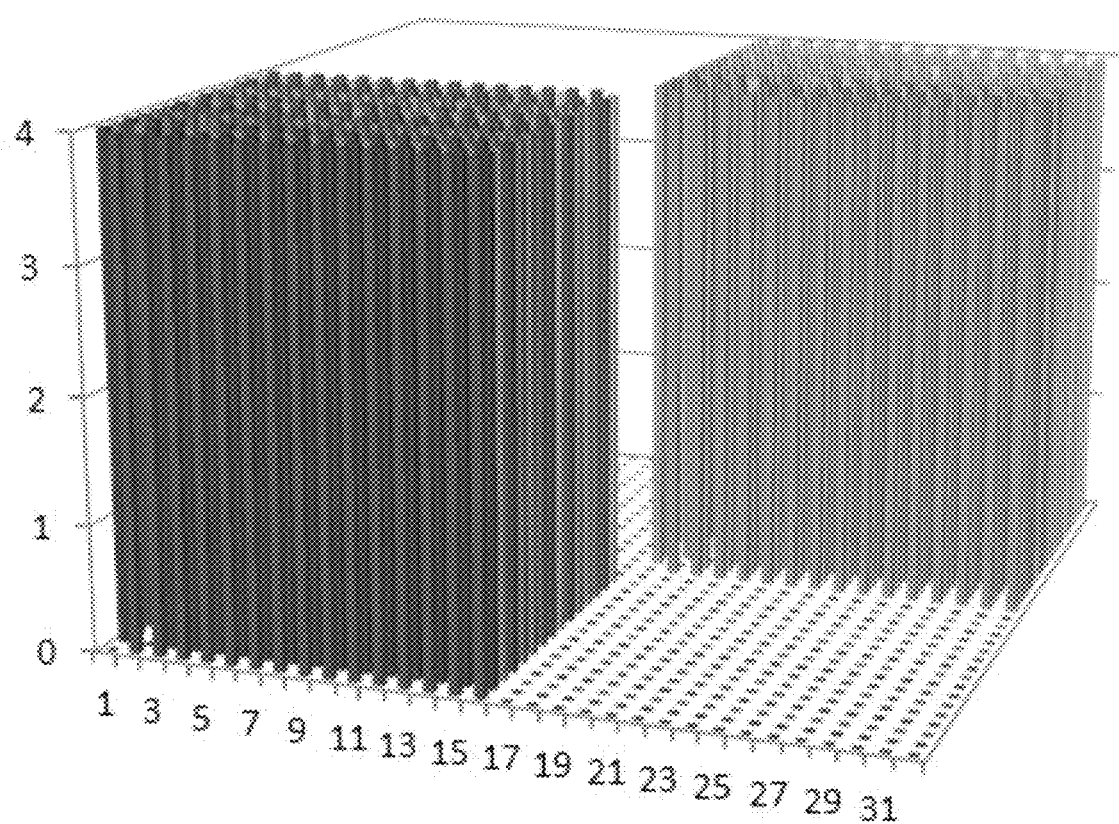
FIG. 4 is a graphical representation of the affinity (dependency relationships) between storage entities with respect to storing protection groups (e.g., as in FIGS. 2 and 3), in accordance with various aspects and implementations of the subject disclosure.

FIGS. 2-4 shows concepts related to affinity between storage entities, which can be nodes or storage devices (such as disks). In the example FIG. 2, there are 32 storage entities represented by the blocks 222(1)-222(32), (not all labeled), numbered left to right, top to bottom. The storage entities store 8 protection groups, represented by circled numerals 1-8. In one implementation, each protection group unites 16 related data and coding fragments, and thus, for example, there are sixteen numeral 1s, sixteen numeral 2s, and so on in FIG. 2.

When the first protection group is created, the storage entities represented by the blocks 222(1)-222(32) are empty. The fragments for a protection group (e.g., protection group 1) are distributed between the first, topmost, 16 nodes/disks (the first two rows of storage entities in FIG. 2). When the second protection group (e.g., protection group 2) is created, based on space considerations the capacity load balancer stores the fragments to the free bottommost 16 nodes/disks, and so on. If affinity-based distribution as described herein is not active, at the end of storing the eight protection sets there are two groups of storage entities with strong affinity. The topmost 16 nodes/disks store 4 protection groups and the bottommost 16 nodes/disks store 4 different protection groups. This grouping effect slows down data recovery after a node/disk failure(s) because after some node/disk failure, such as the storage entity represented by the block 222(8) which contains protection groups 1, 3, 5 and 7, the failed storage entity's groupmates (e.g., the remainder of the topmost 16 nodes or disks) are heavily involved in recovery, while nodes/disks from other groups (e.g., the bottommost 16 nodes or disks) are barely involved if at all, as none of the bottommost 16 nodes or disks contain protection groups 1, 3, 5 and 7.

FIG. 3 shows the concept of an affinity matrix 333 built for the data distribution shown in FIG. 2. A node may create an affinity matrix to maintain and assess the quality of mutual dependence between storage entities in a cluster. In one implementation, an affinity matrix is a square matrix N×N, where N is the number of nodes/disks in the system. A value $X_{i,j}$ in an affinity a matrix indicates a number of protection groups that have their components in both the i-th and j-th storage entities. Note that $X_{i,j}=0$ and $X_{i,j}=X_{j,i}$. As described herein, a node, via the affinity-based data distribution logic 120 attempts to distribute data/coding fragments such that the values $X_{i,j|i\ne1}$ are approximately similar.

Note that instead of a matrix, other data structures can be used to maintain the affinity levels, such as one that leverages the symmetry ($X_{i,j}=0$ and $X_{i,j}=X_{j,i}$) to reduce the size. For example, a flat matrix/list can be used instead of a matrix.

The affinity matrix 333 of FIG. 3 indicates that there is poor distribution of the protection groups with respect to affinity. Indeed, in this extreme example described with reference to FIG. 2, there are two groups of nodes/disks with strong affinity (each groups affinity levels with its groupmates equal four), as shown graphically in FIG. 4. There is no protection group stored between the two storage entity groups (their affinity levels equal zero).

Figure 5:
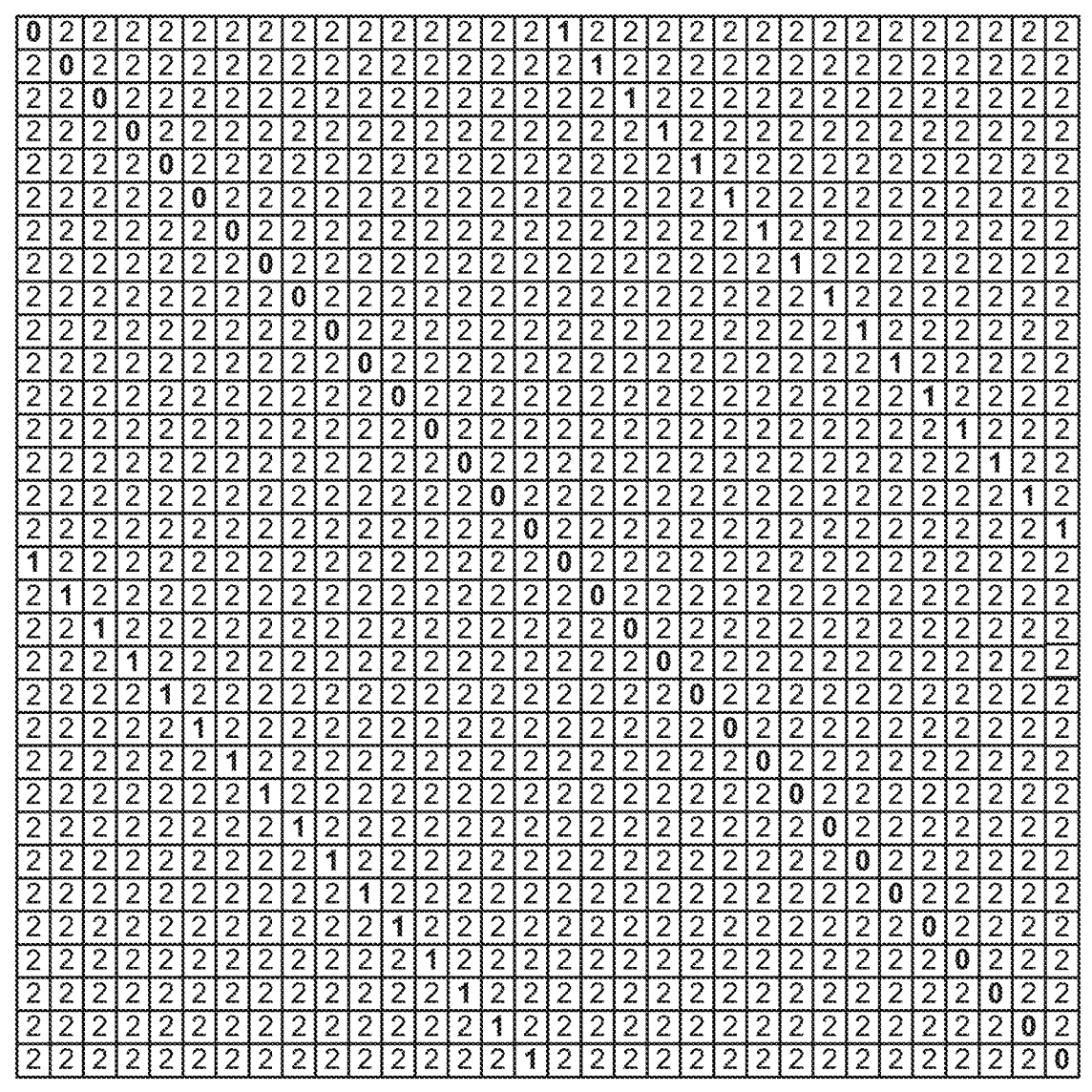
Figure 6:
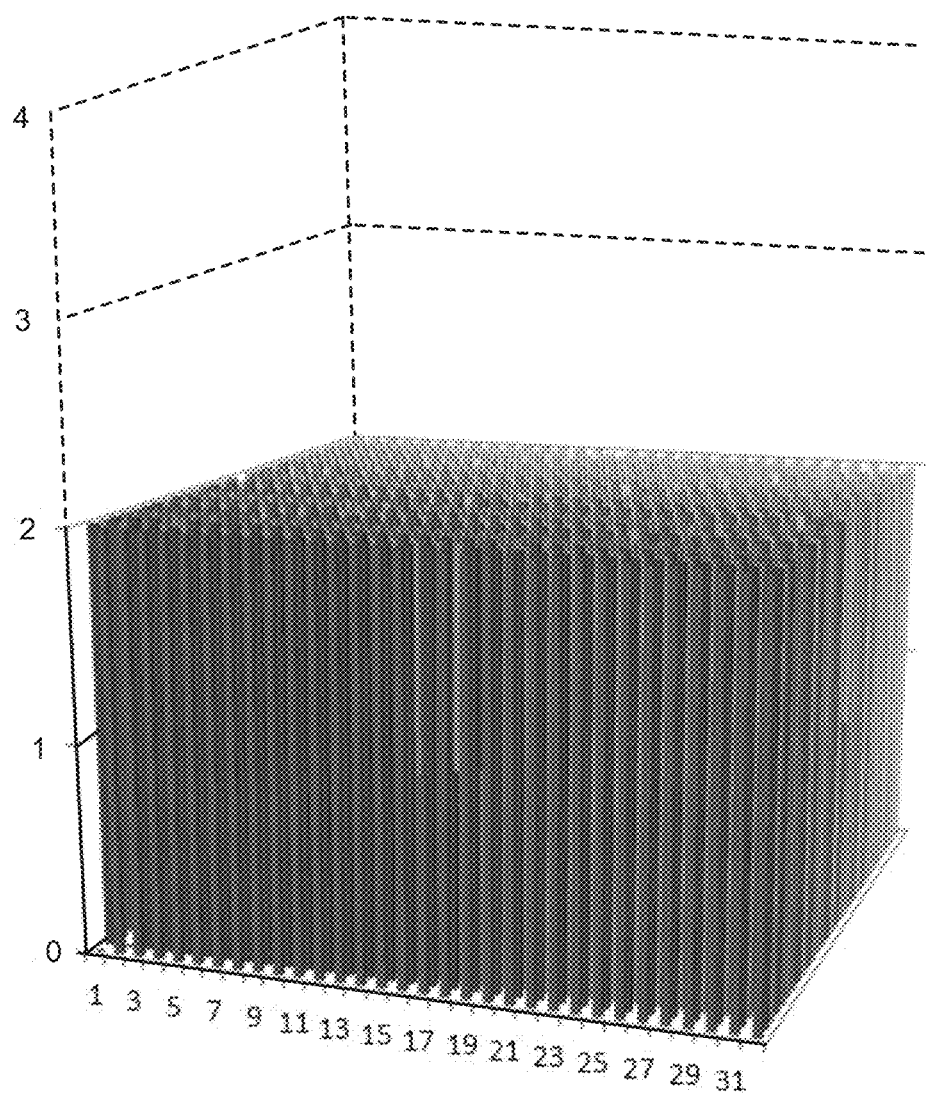
FIG. 6 is a graphical representation of the affinity (dependency relationships) between storage entities with respect to storing protection groups (e.g., as in the matrix of FIG. 5), in accordance with various aspects and implementations of the subject disclosure.

In contrast, FIG. 5 shows an affinity matrix 555 when there is good data distribution with respect to protection groups; FIG. 6 represents this distribution graphically. As described herein, when data and coding fragments are distributed based on considering the affinity between storage entities (nodes or disks), it is possible to create a close to perfect data distribution. By way of example, if node/disk 1 fails, all or virtually all of the other nodes/disks are able to participate in the recovery of the data/coding fragments that node/disk 1 used to store. That is, the potential load balance during data recovery is good, which normally results in faster recovery and lesser probability of overload of some nodes/disks.

Affinity may be managed for nodes or for disks. When affinity is managed at the disk level, the quality of the data distribution is higher. However, a number of disks in a system may be considerably greater than a number of nodes; therefore, an affinity matrix for disks may be much larger than an affinity matrix for nodes, and indeed, an affinity matrix (particularly for disks) can be unacceptably large.

For example, an adaptive approach may be implemented, in which affinity is managed at the disk level for smaller clusters in which a number of disks is moderate, e.g., the total number is less than 1,000 in one or more implementations. Affinity can be managed at the node level for larger clusters, such as if the total number of disks is greater than or equal to 1,000. Note that when a smaller cluster gets expanded and thereby becomes large, an affinity matrix for disks can be easily transformed into an affinity matrix for nodes. To this end, for a given pair of nodes, affinity between the nodes' disks can be summed up to calculate affinity between the nodes. If a larger cluster becomes quite small, the cluster can continue using its affinity matrix for nodes.

Figure 7:
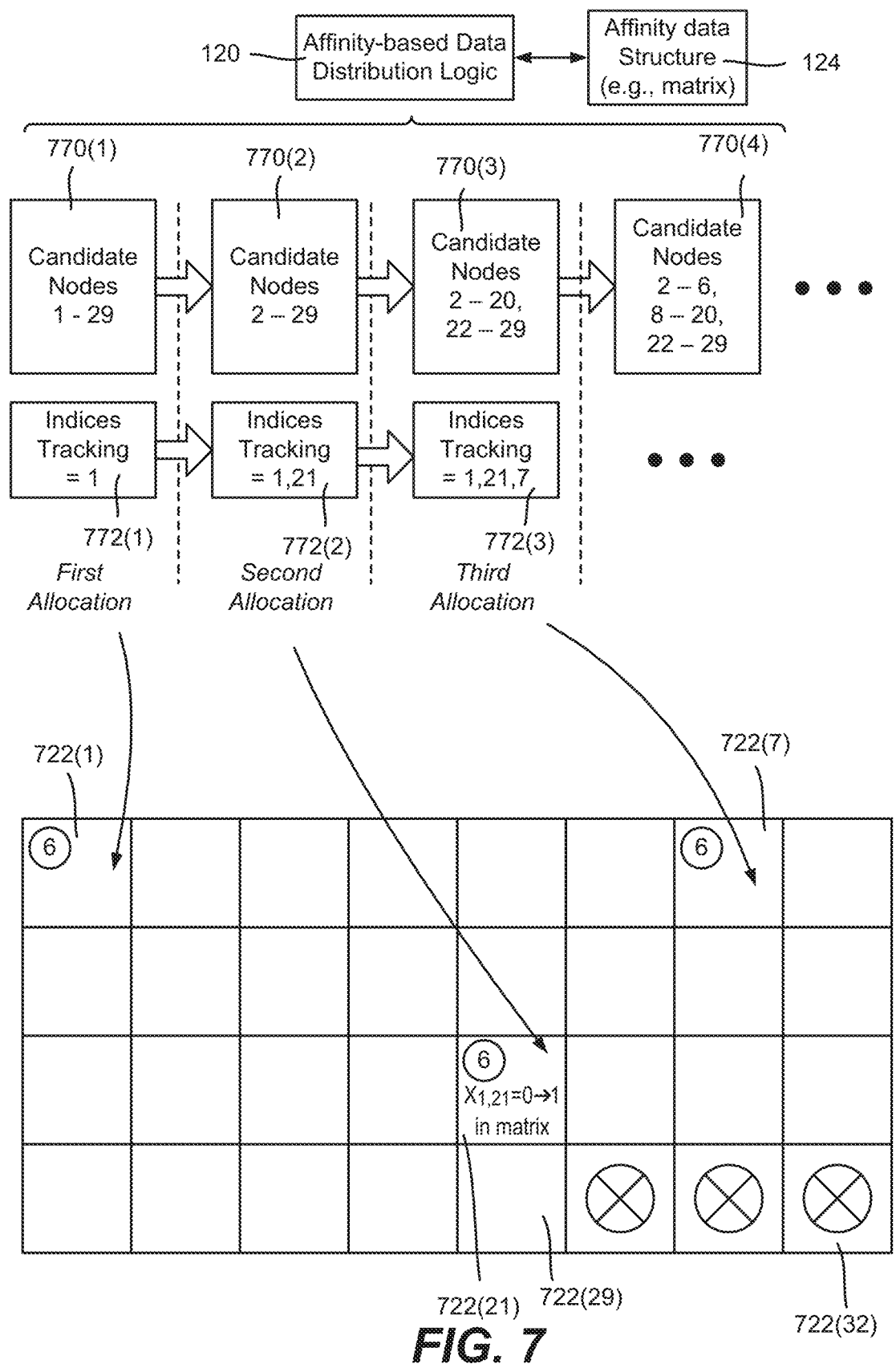
FIG. 7 is a block diagram showing an example how affinity-based data distribution logic can maintain and update data structures to distribute a protection group among storage entities, in accordance with various aspects and implementations of the subject disclosure.
Figure 8:
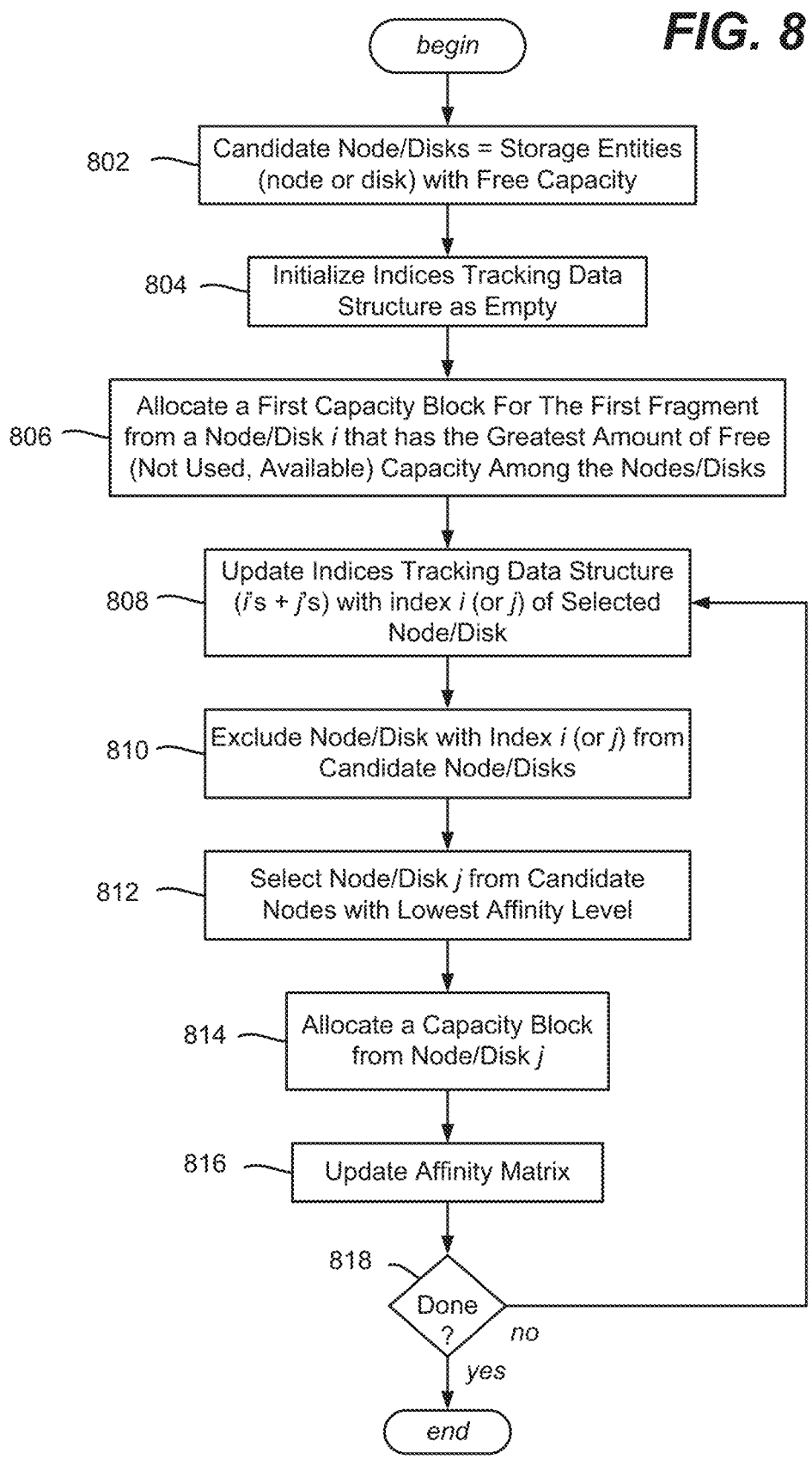
FIG. 8 is a flow diagram showing example operations of affinity-based data distribution logic for distributing a protection group among storage entities, in accordance with various aspects and implementations of the subject disclosure.

For purposes of explanation, the following example of FIGS. 7 and 8 are generally based on managing affinity using nodes as the storage entities; e.g., in FIG. 7 there are 32 nodes (represented by blocks 722(1)-722(32), numbered left to right, top to bottom). If a matrix is used as the affinity data structure, the matrix is 32×32. Note that the circles in the nodes (blocks 722(1)-722(32)) of FIG. 7 represent fragments of data and redundant data (they are not disks) for a protection group identified as protection group 6. Note that if instead affinity is evaluated at the disk level, the affinity of two disks that belong to one node is expected to be less than the affinity of two disks that belong to different nodes.

FIG. 8 shows example operations related to data distribution, e.g. as performed by the affinity-based data distribution logic 120 (FIG. 1). As can be readily appreciated, the logic operates based on the number of nodes N (or disks N×M) being at least reasonably greater than a number of data and coding fragments in a single protection group (k+m), e.g., sixteen. A general concept it that to assure a highest level of data availability, fragments of one protection group are to be as dispersed within a number of nodes/disks as much as possible. The affinity data structure (matrix) is used to assure good affinity balance between nodes/disks.

In general, in one or more implementations, the logic allocates capacity for a protection group, serving multiple protection groups one by one. For example, the operations of FIG. 8 can be repeated for a next protection group and so on.

When starting with another protection group, the capacity load balancer 122 of FIG. 1 can provide a set of candidate storage entities (operation 802). An indices tracking data structure that tracks the nodes (or disks) in use with respect to storing protection group components is initialized to empty, as represented by operation 804.

Operation 806 allocates a first capacity block for the first fragment from a node/disk that has the greatest amount of free (not used, available) capacity among the nodes/disks of the candidate set. This information can be obtained from the capacity load balancer 122 of FIG. 1, which provided the candidate set of nodes/disks that may accommodate data/coding fragments of the protection group to be stored. In the example of FIG. 7, nodes 30, 31, and 32 do not have free capacity (as represented via the X'd out circles; thus, then, the candidate nodes are 1-29 represented by blocks 722(1)-722(29).

For example, the indices tracking data structure can comprise a set of indices, is of the nodes/disks that have donated at least one capacity block for storing the protection group, which via operation 804 is initially empty. Consider that node 1 contains relatively little data, while the other 31 nodes contain substantially more data (and indeed nodes 30, 31 and 32 do not have capacity). Then, according to operation 806, node 1 donates a capacity block for the first fragment of the protection group, whereby the indices tracking data structure contains one value, a 1 (representing node 1). This is shown in FIG. 7 (the first allocation) and 8, in which operation 808 of FIG. 8 puts the node identifier (of 1) as an index in the indices tracking data structure (shown in FIG. 7 in a state 722(1) after updating), and operation 810 which takes node 1 from the candidate set, shown in state 770(1). After operation 810, the state of the candidate set is represented by block 770(2), corresponding to candidate nodes 2-29.

Operation 812 attempts to find a next capacity block; when allocating a capacity block for another data/coding fragment, operation 812 finds a node/disk j, which has free capacity for at least one data/coding fragment and can accommodate another fragment without violating the standard limitations on data distribution (e.g. one node cannot store more than m data/coding fragments).

Consider that in this example the affinity-based distribution logic needs to store a fragment per node. As set forth above, after excluding the nodes that have already donated a capacity block (as indexed in the indices tracking data structure, namely node 1 at this time) from the list of the candidate nodes, the remaining candidate nodes are 2-29. From these nodes, operation 812 selects the node/disk with the lowest value $X_{i,j}$ (has lowest affinity level), where i≠j.

Continuing with the example, at this time the set of is i's only 1, and j is one of the indices of the remaining candidate nodes (2-29). Consider that the affinity levels of $X_{i,j}$ are >0, except for $X_{1,21}$, which is 0. This means that no protection group has its fragments in both node 1 and node 21. Thus, node 21 is selected to accommodate the second fragment of the protection group, with the capacity block allocated at operation 814. This is also represented in FIG. 7 by the second allocation, where the indices tracking data structure is now in a state 772(2) containing node identifiers 1 and 21, with the candidate node set changed to a state 770(3) to indicate that the remaining candidate nodes are 2-20 and 22-29. Note that in the event of a tie among affinity levels, e.g., all candidate storage entities have the same affinity between them, a tiebreaker such as most available capacity can be used to select a next storage entity.

After allocating a block from node 21 for the second fragment, the affinity data structure is updated at operation 816, that is, incremented in one implementation. For example, the affinity level value in the matrix at $X_{1,21}$ is updated (as well as $X_{21,1}$ because of the symmetric affinity matrix). This is also shown in FIG. 7, where the block 722(21) has a corresponding affinity level (actually in the matrix, but shown in the block 722(21) for purposes of illustration) increased from 0 to 1, ($X_{1,21}$=0→1).

Consider that in a next iteration, in a third allocation node 7 (block 722(7)) is selected for the third fragment. This is shown in the indices tracking data structure changing from state 772(2) (nodes 1, 21) to state 772(3) (nodes 1, 21, 7) and node 7 being removed from the candidate node set in the state 770(4). As is understood, there is now more affinity between these nodes, and thus the process increments $X_{1,7}$ and $X_{7,21}$ in the affinity matrix (and symmetrically $X_{7,1}$ and $X_{21,7}$ and $X_{1,21}$) because the new protection group state creates additional affinity between nodes 1, 21, and 7, at operation 816.

Data distribution (capacity allocation) is successful when k+m capacity blocks are allocated for the protection group, as evaluated via operation 818. Note that the operations of FIG. 8 fail if operation 812 cannot find a node/disk j. In such an event, affinity can be ignored (affinity-based distribution can be deactivated) while allocating capacity thereafter (and optionally warn the client of the situation), although it is alternatively feasible to return a "NoCapacity" error to a data client.

Returning to FIG. 1, in practical applications the affinity-based data distribution logic 120 needs to cooperate with other components such as the capacity load balancer 122 and IO load balancer 124. The three components may work together by having the capacity load balancer 122 provide the set of nodes/disks that may accommodate data/coding fragments of the protection group to be stored. The capacity load balancer 122 is in general not too restrictive; hysteresis or the like (e.g., statistical data) may be used to ensure the set of nodes/disks is wide enough for the further operations.

With this candidate set, the data affinity-based data distribution logic 120 component finds nodes/disks for the data/coding fragments as described herein with reference to FIGS. 7 and 8. Once found, the IO load balancer 126 can assign the data fragments and the coding fragments to the allocated capacity blocks in the way other cluster nodes/disks store similar amounts of (normally hotter) data fragments and similar amount of (normally colder) coding fragments. For example, the sixteen fragments and sixteen node or disk identifiers are given to the IO load balancer 126, whereby the IO load balancer 126 assigns the fragments to the nodes/disks as appropriate.

Figure 9:
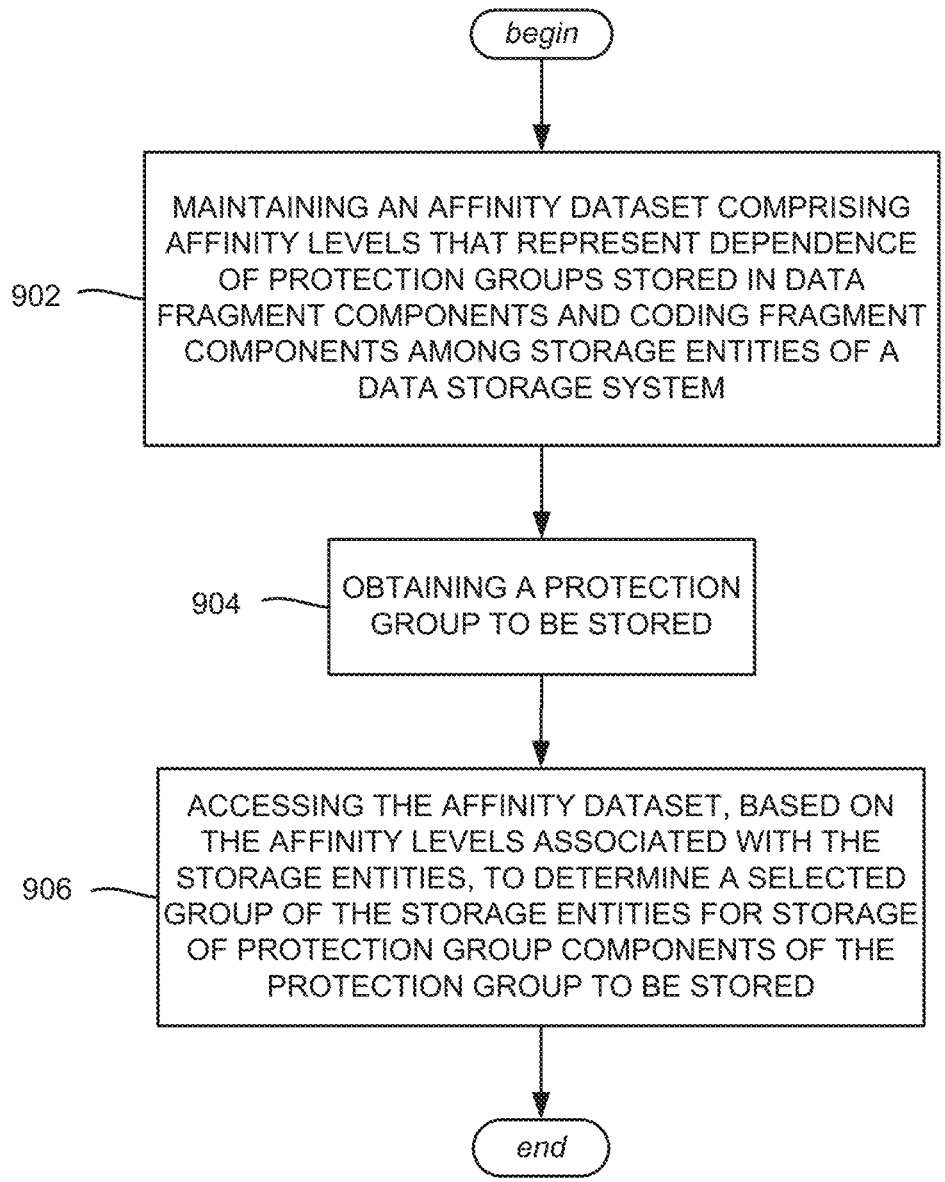
FIG. 9 is a flow diagram showing example operations for using affinity data to distribute protection group components, in accordance with various aspects and implementations of the subject disclosure.

One or more aspects can be embodied in a system, such as represented in FIG. 9, and for example can comprise a memory that stores computer executable components and/or operations, and a processor that executes computer executable components and/or operations stored in the memory. Example operations can comprise operation 902, which represents maintaining an affinity dataset comprising affinity levels that represent dependence of protection groups stored in data fragment components and coding fragment components among storage entities of a data storage system. Operation 904 represents obtaining a protection group to be stored. Operation 906 represents accessing the affinity dataset, based on the affinity levels associated with the storage entities, to determine a selected group of the storage entities for storing protection group components of the protection group to be stored.

Further operations can comprise determining a group of the storage entities that have capacity blocks available for allocation, and wherein the accessing the affinity dataset comprises reading the affinity levels of the group of the storage entities that have the capacity blocks available for the allocation to determine the selected group of the storage entities. Determining the group of the storage entities that have the capacity blocks available for the allocation can comprise obtaining, from a capacity load balancer, capable storage entities that have capacity for storage of the protection group components of the protection group to be stored, and wherein the accessing the affinity dataset to determine the selected group of the storage entities comprises evaluating respective affinity levels associated with the capable storage entities.

Accessing the affinity dataset to determine the selected group of the storage entities can comprise determining which of the storage entities have lowest affinity levels of the affinity levels in the affinity dataset.

The storage entities can comprise nodes of the data storage system. The storage entities can comprise storage devices, and the storage devices can be arranged as respective storage device groups associated with respective nodes of the data storage system.

Further operations can comprise storing the protection group components among the selected group of the storage entities, and updating the affinity dataset in conjunction with the storing the protection group components to represent updated affinity levels among the storage entities. Storing the protection group components can comprise providing the protection group components and the selected group of the storage entities to an input-output load balancer device.

The protection group to be stored among the storage entities of the data storage system can comprise twelve data fragments, and four coding fragments encoded from the twelve data fragments.

The affinity dataset can comprise a matrix data structure having a first dimension based on a number of storage entities available for storage of the protection groups and a second dimension based on the number of storage entities.

Figure 10:
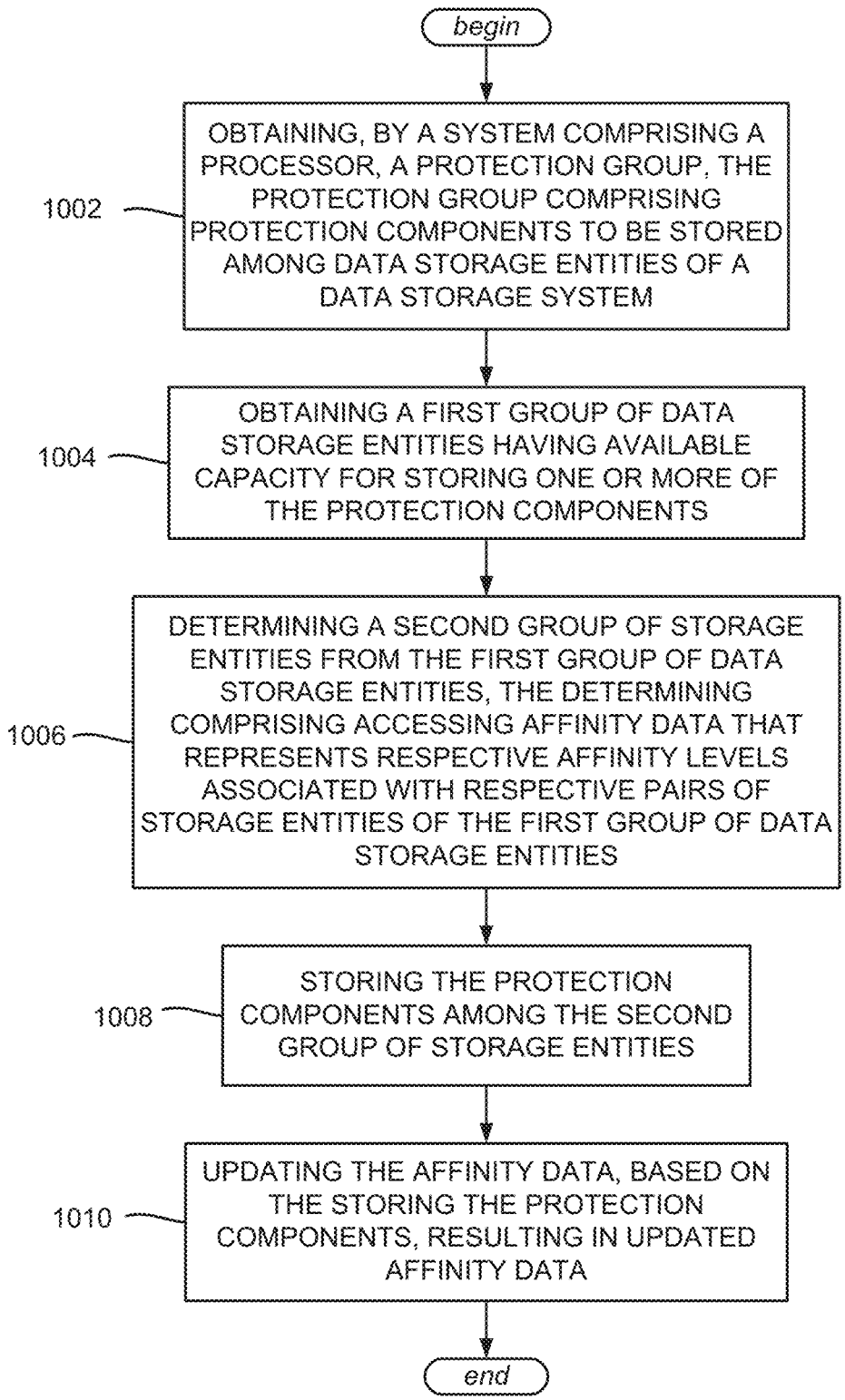
FIG. 10 is a flow diagram showing example operations for determining which storage entities to use for storing a protection set based on affinity data, in accordance with various aspects and implementations of the subject disclosure.

One or more example aspects, such as corresponding to operations of a method, are represented in FIG. 10. Operation 1002 represents obtaining, by a system comprising a processor, a protection group, the protection group comprising protection components to be stored among data storage entities of a data storage system. Operation 1004 represents obtaining a first group of data storage entities having available capacity for storing one or more of the protection components. Operation 1006 represents determining a second group of storage entities from the first group of data storage entities, the determining comprising accessing affinity data that represents respective affinity levels associated with respective pairs of storage entities of the first group of data storage entities. Operation 1008 represents storing the protection components among the second group of storage entities. Operation 1010 represents updating the affinity data, based on the storing the protection components, resulting in updated affinity data.

Aspects can comprise excluding a storage entity from the first group of data storage entities based on a data distribution constraint.

Storing the protection group components can comprise outputting the protection group components and the second group of the storage entities to an input-output load balancer device.

A portion of the affinity data for a pair of the respective pairs of storage entities can represent a number of matching protection components stored in common by the pair; updating the affinity data can comprise incrementing the number of matching protection components for pairs of storage entities of the second group of storage entities.

The affinity data can be maintained as a symmetrical matrix data structure of values comprising dimensions based on a number of data storage entities that store protection components in the data storage system; incrementing the number of matching protection components for the pairs of storage entities of the second group of storage entities can comprise, for respective pairs, incrementing a respective first matrix value indexed by a respective first identifier of a first associated storage entity of a respective pair and a respective second identifier of a second associated storage entity of the respective pair, and incrementing a respective second matrix value indexed by the respective second identifier of the associated storage entity of the respective pair and the respective first identifier of the first associated storage entity of the respective pair.

Obtaining the first group of data storage entities can comprise receiving the first group of data storage entities from a capacity load balancer. Storing the protection group components can comprise sending the protection group components and the second group of the storage entities to an input-output load balancer device.

Figure 11:
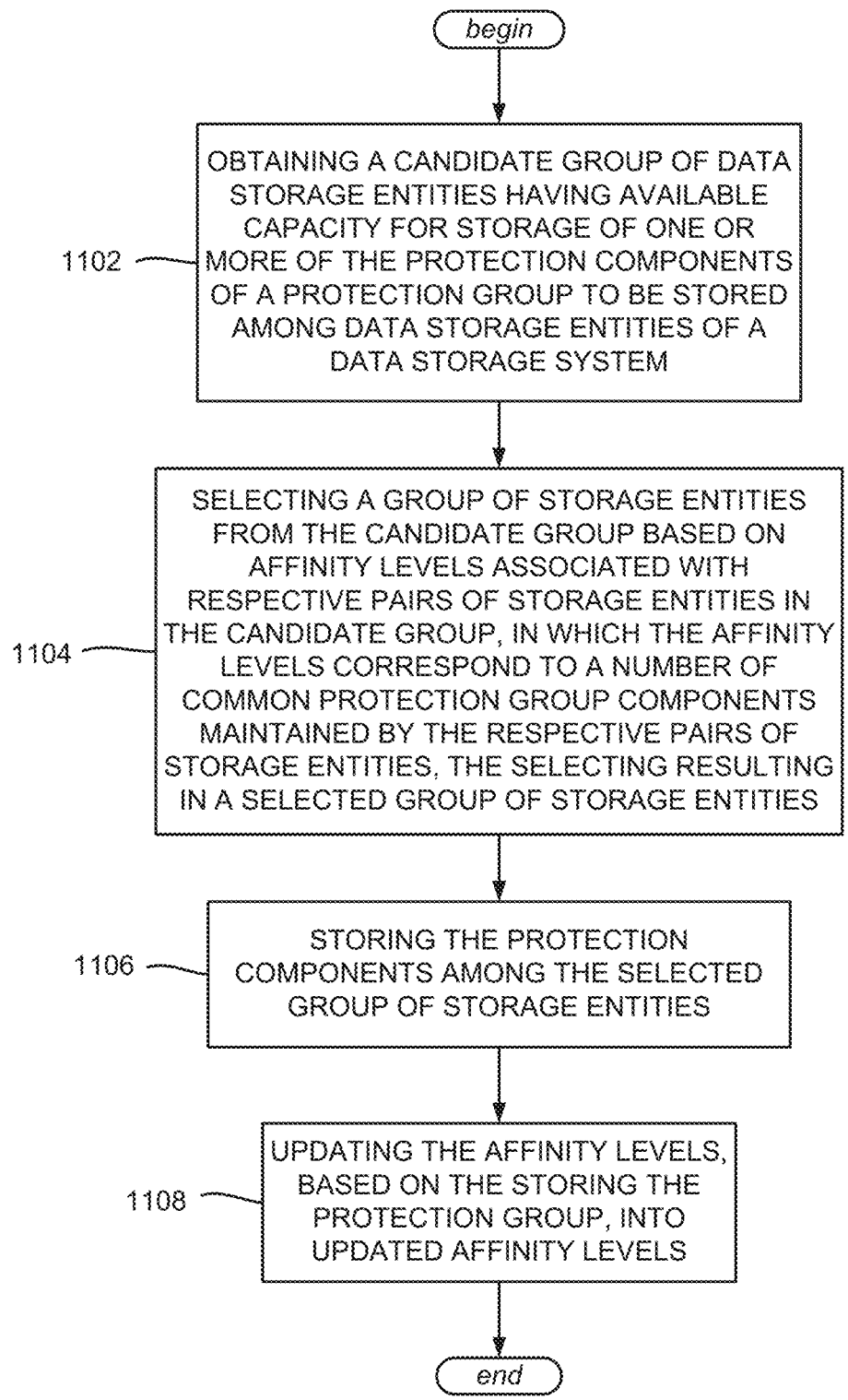
FIG. 11 is a flow diagram showing example operations related to selecting storage entities to use, based on affinity data, for storing a protection set, in accordance with various aspects and implementations of the subject disclosure.

FIG. 11 summarizes various example operations, e.g., corresponding to a machine-readable storage medium, comprising executable instructions that, when executed by a processor of a system, facilitate performance of operations. Operation 1102 represents obtaining a candidate group of data storage entities having available capacity for storage of one or more of the protection components of a protection group to be stored among data storage entities of a data storage system. Operation 1104 represents selecting a group of storage entities from the candidate group based on affinity levels associated with respective pairs of storage entities in the candidate group, in which the affinity levels correspond to a number of common protection group components maintained by the respective pairs of storage entities, the selecting resulting in a selected group of storage entities. Operation 1106 represents storing the protection components among the selected group of storage entities. Operation 1108 represents updating the affinity levels, based on the storing the protection group, into updated affinity levels.

Further operations can comprise excluding a storage entity from the candidate group based on a data distribution constraint. Selecting the group of storage entities from the candidate group based on the affinity levels can comprise selecting the group of storage entities from the candidate group based on affinity among the storage entities.

As can be seen, the technology described herein provides for distributing protection groups among storage entities based on current affinity levels between the storage entities. Via the affinity-based distribution, more storage entities can be involved in a recovery operation, and as such, the technology described herein facilitates more efficient data recovery operations in the event of a storage entity failure.

Figure 12:
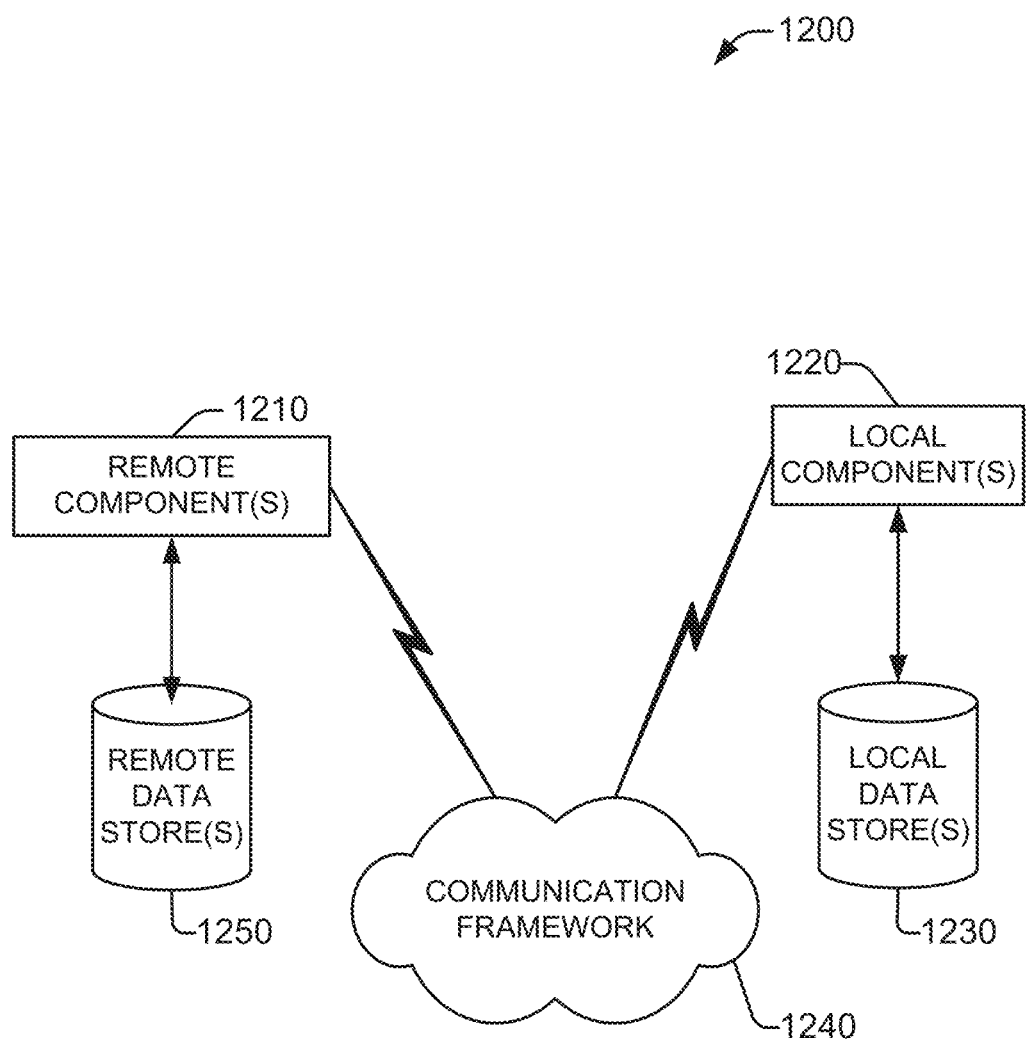
FIG. 12 depicts an example schematic block diagram of a computing environment with which the disclosed subject matter can interact.

FIG. 12 is a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc.

Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Figure 13:
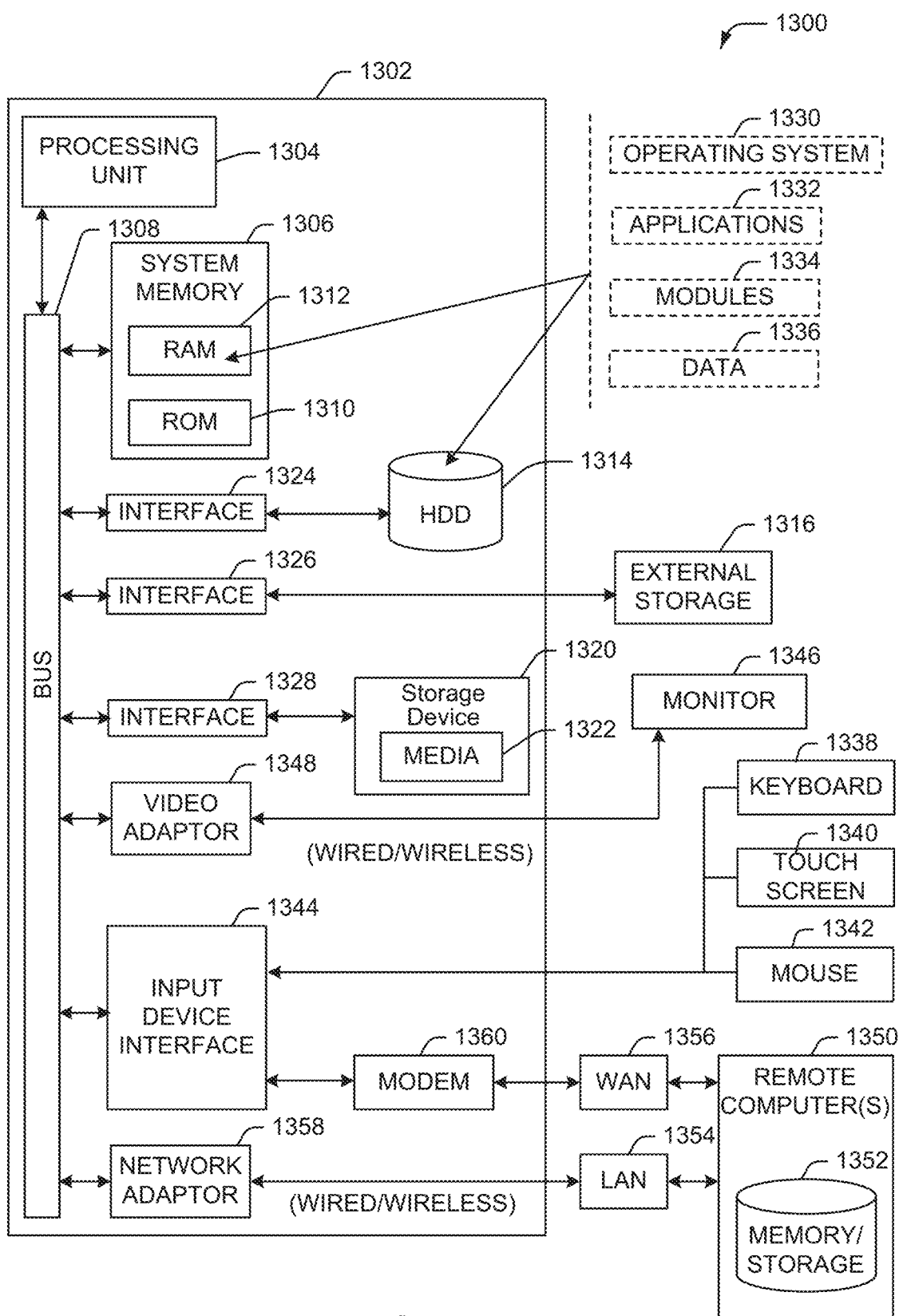
FIG. 13 illustrates an example block diagram of a computing system operable to execute the disclosed systems and methods in accordance with various aspects and implementations of the subject disclosure.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
a processor, and
a memory that stores executable instructions that, when executed by the processor, facilitate performance of operations, the operations comprising:
maintaining an affinity dataset comprising affinity levels that represent numbers of protection groups comprising data fragments and coding fragments stored in corresponding data fragment components and coding fragment components among storage entities of a data storage system;
obtaining a protection group to be stored;
accessing the affinity dataset, based on the affinity levels associated with the storage entities, to determine a selected group of the storage entities for storage of one or more data fragments and coding fragments of the protection group to be stored,
storing the one or more data fragments and coding fragments of the protection group to be stored among the selected group of the storage entities; and
updating the affinity dataset in conjunction with the storing the one or more data fragments and coding fragments to represent updated affinity levels among the storage entities.

2. The system of claim 1, wherein the operations further comprise determining a group of the storage entities that have capacity blocks available for allocation, and wherein the accessing the affinity dataset comprises reading the affinity levels of the group of the storage entities that have the capacity blocks available for the allocation to determine the selected group of the storage entities.

3. The system of claim 2, wherein the determining the group of the storage entities that have the capacity blocks available for the allocation comprises obtaining, from a capacity load balancer, capable storage entities that have capacity for the storage of the one or more data fragments and coding fragments of the protection group to be stored, and wherein the accessing the affinity dataset to determine the selected group of the storage entities comprises evaluating respective affinity levels associated with the capable storage entities.

4. The system of claim 1, wherein the accessing the affinity dataset to determine the selected group of the storage entities comprises determining which of the storage entities have lowest affinity levels of the affinity levels in the affinity dataset.

5. The system of claim 1, wherein the storage entities comprise nodes of the data storage system.

6. The system of claim 1, wherein the storage entities comprise storage devices, and wherein the storage devices are arranged as respective storage device groups associated with respective nodes of the data storage system.

7. The system of claim 1, wherein the storing the protection group components comprises providing the one or more data fragments and coding fragments and the selected group of the storage entities to an input-output load balancer device.

8. The system of claim 1, wherein the protection group to be stored among the storage entities of the data storage system comprises twelve data fragments, and four coding fragments encoded from the twelve data fragments.

9. The system of claim 1, wherein the affinity dataset comprises a matrix data structure having a first dimension based on a number of storage entities available for storage of the protection groups and a second dimension based on the number of storage entities.

10. A method comprising,
obtaining, by a system comprising a processor, a protection group, the protection group comprising one or more data fragments and coding fragments to be stored among data storage entities of a data storage system;
obtaining a first group of data storage entities having available capacity for storing the one or more data fragments and coding fragments:
determining a second group of storage entities from the first group of data storage entities, the determining comprising accessing affinity data that represents respective affinity levels indicating numbers of protection groups stored at respective pairs of storage entities of the first group of data storage entities;
storing the one or more data fragments and coding fragments among the second group of storage entities; and
updating the affinity data, based on the storing the one of more data fragments and coding fragments, resulting in updated affinity data.

11. The method of claim 10, further comprising excluding a storage entity from the first group of data storage entities based on a data distribution constraint.

12. The method of claim 10, wherein the storing the one or more data fragments and coding fragments comprises outputting the one or more data fragments and coding fragments and the second group of the storage entities to an input-output load balancer device.

13. The method of claim 10, wherein a portion of the affinity data for a pair of the respective pairs of storage entities represents a number of matching data fragments and coding fragments stored in common by the pair, and wherein the updating the affinity data comprises incrementing the number of matching data fragments and coding fragments for pairs of storage entities of the second group of storage entities.

14. The method of claim 13, wherein the affinity data is maintained as a symmetrical matrix data structure of values comprising dimensions based on a number of data storage entities that store data fragments and coding fragments in the data storage system, and wherein the incrementing the number of matching data fragments and coding fragments for the pairs of storage entities of the second group of storage entities comprises, for respective pairs, incrementing a respective first matrix value indexed by a respective first identifier of a first associated storage entity of a respective pair and a respective second identifier of a second associated storage entity of the respective pair, and incrementing a respective second matrix value indexed by the respective second identifier of the associated storage entity of the respective pair and the respective first identifier of the first associated storage entity of the respective pair.

15. The method of claim 10, wherein the obtaining the first group of data storage entities comprises receiving the first group of data storage entities from a capacity load balancer.

16. The method of claim 10, wherein the storing the one or more data fragments and coding fragments comprises sending the one or more data fragments and coding fragments and the second group of the storage entities to an input-output load balancer device.

17. A non-transitory machine-readable medium, comprising executable instructions that, when executed by a processor, facilitate performance of operations, the operations comprising:
obtaining a candidate group of data storage entities having available capacity for storage of one or more data fragments and coding fragments of a protection group to be stored among data storage entities of a data storage system;
selecting a group of storage entities from the candidate group based on affinity levels associated with respective pairs of storage entities in the candidate group, in which the affinity levels correspond to a number of common data fragments and coding fragments maintained by the respective pairs of storage entities, the selecting resulting in a selected group of storage entities;
storing the one or more data fragments and coding fragments among the selected group of storage entities; and
updating the affinity levels, based on the storing the protection group, into updated affinity levels.

18. The non-transitory machine-readable medium of claim 17, wherein the operations further comprise excluding a storage entity from the candidate group based on a data distribution constraint.

19. The non-transitory machine-readable medium of claim 17, wherein the selecting the group of storage entities from the candidate group based on the affinity levels comprises selecting the group of storage entities from the candidate group based on affinity among the storage entities.

20. The non-transitory machine-readable medium of claim 17, wherein a matrix data structure is used to represent the affinity levels, the matrix data structure having a first dimension based on a number of available storage entities available for storage of protection groups and a second dimension based on a number of the candidate group of data storage entities.

\* \* \* \* \*